Aug. 27, 1929.    H. L. MITCHELL    1,725,817
FLEXIBLE TREAD TRUCK
Filed Feb. 25, 1925
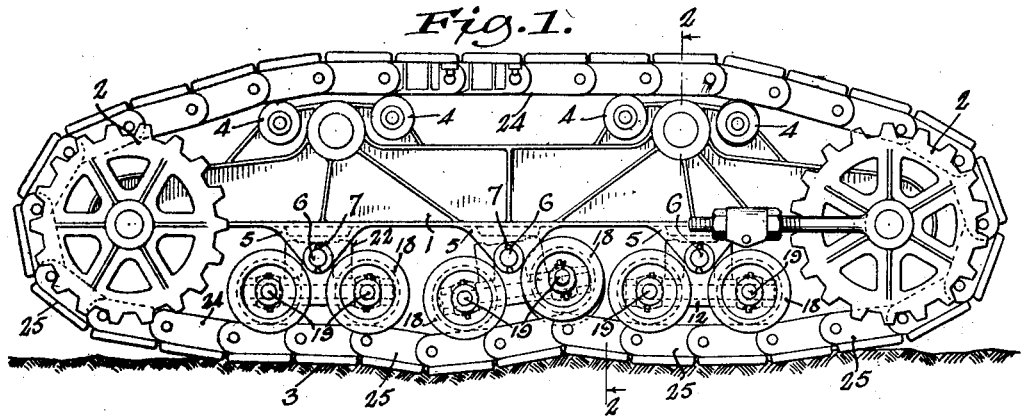
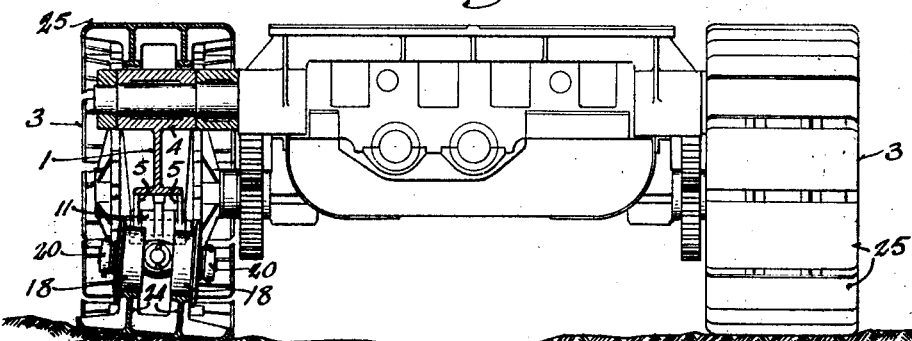
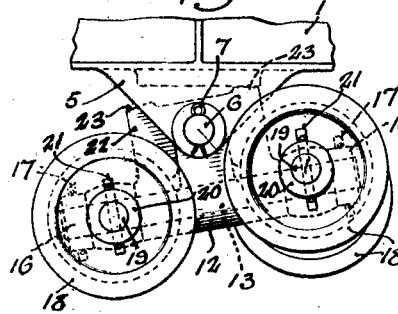
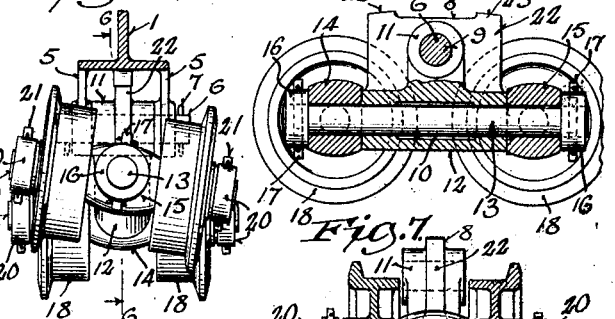
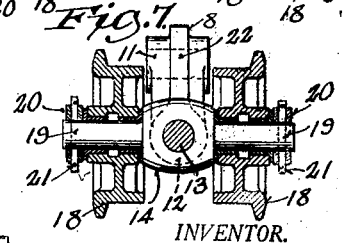
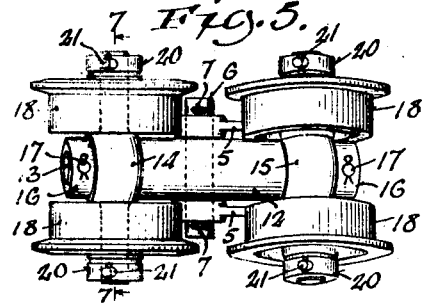
INVENTOR.
HOLGER L. MITCHELL
BY
ATTORNEYS.

Patented Aug. 27, 1929.

1,725,817

UNITED STATES PATENT OFFICE.

HOLGER L. MITCHELL, OF MILWAUKEE, WISCONSIN, ASSIGNOR TO HARNISCHFEGER CORPORATION, OF MILWAUKEE, WISCONSIN, A CORPORATION OF WISCONSIN.

FLEXIBLE-TREAD TRUCK.

Application filed February 25, 1925. Serial No. 11,411.

This invention relates to improvements in trucks of the character used in connection with the flexible treads or endless driving belts of tractors and more particularly to an improved construction of and means for mounting the rollers of the truck whereby they may readily adjust themselves in conformance with the various positions assumed by the tread members as the tractor moves over an uneven surface.

Tractors of the character referred to comprise, in general, a frame, sprocket wheels rotatably supported at each end thereof, an endless flexible belt arranged over the wheels for movement with respect to the frame and for contact with the ground, and one or more trucks connected to the frame and arranged between the same and the ground run of the belt, the rollers of the truck or trucks engaging the belt to provide a suitable support therefor at points intermediate the sprocket wheels. In tractors as heretofore constructed, however, these trucks have been largely incapable of lateral or transverse adjustment to accommodate lateral tilting of the treads occasioned by unevenness in the ground over which the tractor moves; this in turn greatly impairing the traction while at the same time causing tremendous strain upon the trucks and rollers thereof.

One of the objects of the present invention, therefore, is to provide an improved truck of the character described which shall be so constructed and mounted that the rollers thereof shall be capable of substantially universal movement with respect to the tractor frame so that when in engagement with the ground run of the driving belt of a tractor said rollers may assume various positions in conformance with the positions assumed by the tread members of the belt as the tractor moves over uneven ground, thus maintaining maximum traction.

Another object is to provide an improved truck of the character described which has many advantages over those heretofore constructed as regards simplicity, durability, cost of manufacture, and flexibility of operation.

Other objects and advantages will hereinafter appear.

For the purpose of illustrating the invention an embodiment thereof is shown in the drawings, in which Figure 1 is a side elevation of part of a tractor showing one form of the improved trucks operatively associated therewith;

Fig. 2 is a section on line 2—2 of Fig. 1;

Fig. 3 is an enlarged fragmentary view, showing the manner in which the improved trucks may be connected to the tractor frame for pivotal or rotary movement with respect thereto, and the universal movement of the truck rollers with respect to the tractor frame;

Fig. 4 is an end elevation, looking toward the left in Fig. 3;

Fig. 5 is a bottom plan view of Fig. 3;

Fig. 6 is a section on line 6—6 of Fig. 4, the rollers being shown in their normal position when the tractor is on even ground;

Fig. 7 is a section on line 7—7 of Fig. 5; and

Fig. 8 is a side elevation of one of the parts.

Tractors with which trucks made in accordance with the present invention are particularly adapted for use may comprise a frame having a member 1 at each side thereof, sprocket wheels 2 rotatably mounted at each end of the frame, and an endless flexible belt 3 arranged upon the wheels for relative movement with respect to the tractor frame, suitable means such as idle rollers 4 being rotatably supported by frame members 1 and arranged under the upper portion of belt 3 to support and hold the same in proper spaced relation with respect to the frame. Each side member 1 of the frame may be provided with spaced lugs 5 depending therefrom and provided with registering openings to receive suitable means such as pins 6 for connecting the improved trucks to the frame for pivotal or rotary movement about axes transverse to the frame, the pins being held in assembled relation by cotter pins 7 passing through the ends thereof.

The improved truck and the manner in which the rollers thereof are mounted for universal movement with respect to the tractor frame will now be described, referring more particularly to Figs. 3 to 8. The truck comprises a body portion or bearing member 8 which is provided with openings 9 and 10 arranged in different horizontal planes and at right angles with respect to each other to form bearings 11 and 12, respectively, bearing 11 receiving pin 6 whereby the truck is connected to the tractor frame for pivotal or rotary movement about an axis transverse thereto. Bearing 12 receives a suitable shaft 13 upon the ends of which axles 14 and 15 are loosely mounted and held in operative position thereon by collars 16 fitted upon the ends of the shaft and suitable pins 17 passing through the collars and the shaft, as more clearly shown in Figs. 5 and 6, the central portion of each axle being enlarged, as shown, to receive the ends of shaft 13.

Flanged rollers 18 are loosely mounted upon the ends 19 of axles 14 and 15 and held in position thereon by any suitable means such as collars 20 and cotter pins 21 passing through the collars and the ends 19 of the axles. The body portion 8 may be reinforced by means of a flange 22 connecting bearings 11 and 12. The upper corners of flange 22 may be extended beyond the upper edge thereof to provide stops 23 adapted to engage the under side of frame members 1, as shown in Fig. 3, to limit rotary movement of the truck in either direction about pin 6. The flanged rollers 18 engage the inwardly extending sectional tracks formed by the flanges 24 of the individual tread members 25 shown in Fig. 2, and may rotate about shaft 13 in planes parallel to pin 6 in adjusting themselves to lateral tilting movement of the tread members. If the tractor should meet an obstacle to cause certain of the tread members 25 to tilt about axes transverse to the tractor and assume a position such as is shown in Fig. 1, the truck will rotate about pin 6 to permit rollers 18 to adjust themselves in accordance with such position.

From the foregoing it will be seen that a truck of the character described has been provided which is simple in construction, durable, one which has great flexibility in operation and is capable of substantially universal adjustment.

It will of course be appreciated that shaft 6 may be either fixed against rotation with respect to body portion 8 or be rotatably mounted therein, as desired.

Various changes in the size, shape and arrangement of the parts may be adopted without departing from the spirit of the invention or the scope of the claims.

The invention claimed is:

1. In a tractor having a side frame member, a truck provided with sleeve-like bearings arranged in different horizontal planes and at right angles with respect to each other, one of the sleeve-like bearings being adapted to coact with means for positively and directly pivotally connecting the truck to the frame, a shaft mounted in the other sleeve-like bearing and projecting beyond the same, axles supported by the shaft for pivotal movement with respect to the truck and rollers mounted on the axles.

2. In a tractor having a side frame member, a truck provided with sleeve-like bearings integrally connected and arranged in different horizontal planes and at right angles with respect to each other, a reinforcing flange integral with and connecting the sleeve-like bearings, one of said sleeve-like bearings being adapted to coact with means for positively and directly pivotally connecting the truck to the frame, a shaft mounted in the other sleeve-like bearing and having its ends projecting beyond the same, axles supported on the projecting ends of the shaft for pivotal movement with respect to the truck and rollers mounted on the axles.

3. In a tractor having a side frame member formed with a pair of depending spaced pivot lugs, a truck comprising a body portion formed with a transverse bearing adjacent its upper end adapted to be fitted loosely between the lugs of the frame and to be pivotally connected thereto, said body portion also having an integral sleeve-like bearing extending longitudinally thereof and arranged below the transverse bearing, a shaft supported for the major portion of its extent in the sleeve-like bearing and having its ends projecting beyond the same, axles supported by the ends of the shafts for tilting movement and rollers mounted on the axles.

4. In a truck of the character described, a member provided with bearings arranged in different horizontal planes and at right angles with respect to each other, a reinforcing flange connecting said bearings, one of said bearings being adapted and arranged to receive means for connecting said member to a tractor frame for rotary movement about an axis transverse thereto, the other of said bearings being adapted and arranged to receive means for connecting rollers to said member for rotary movement in planes parallel to said axis, and stops adapted to engage said tractor frame to limit rotary movement of said member in either direction about said axis.

In witness whereof I hereto affix my signature.

HOLGER L. MITCHELL.